United States Patent
Schoentag et al.

(10) Patent No.: US 6,395,990 B1
(45) Date of Patent: May 28, 2002

(54) INSULATING CARRIERS FOR VACUUM CIRCUIT BREAKERS

(75) Inventors: Hartmut Schoentag, Hohen; Andreas Stelzer; Reinhard Zeuke, both of Berlin, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/830,165

(22) PCT Filed: Oct. 12, 1999

(86) PCT No.: PCT/DE99/03307
§ 371 (c)(1),
(2), (4) Date: Apr. 23, 2001

(87) PCT Pub. No.: WO00/25335
PCT Pub. Date: May 4, 2000

(30) Foreign Application Priority Data

Oct. 23, 1998 (DE) .......................... 198 50 207

(51) Int. Cl.[7] ............................... H01B 17/00
(52) U.S. Cl. ................... 174/158 R; 218/134
(58) Field of Search ........................ 174/158 R, 161 R, 174/135, 163 R; 218/134, 139, 155

(56) References Cited

U.S. PATENT DOCUMENTS

| | | | |
|---|---|---|---|
| 4,449,021 A | | 5/1984 | Wakayama et al. |
| 5,512,724 A | * | 4/1996 | Binder et al. ............... 218/139 |
| 5,767,451 A | | 6/1998 | Rohling et al. |
| 5,864,108 A | * | 1/1999 | Rohling et al. ............. 218/134 |
| 6,326,872 B1 | * | 12/2001 | Marchard et al. .......... 218/139 |

FOREIGN PATENT DOCUMENTS

| | | |
|---|---|---|
| DE | G94 09 006.8 | 5/1994 |
| WO | 96/18225 | 6/1996 |

\* cited by examiner

*Primary Examiner*—Dean A. Reichard
*Assistant Examiner*—Adolfo Nino
(74) *Attorney, Agent, or Firm*—Morrison & Foerster, LLP

(57) ABSTRACT

The insulating bases are provided by pole shells for accommodation of vacuum contactors, with the pole shells each having an enclosure profile which is curved inward and, for detachable connection to the vacuum contactors, each being equipped with vacuum contactor attachment webs which are arranged as mirror images of one another. For detachable connection to the switchgear assemblies, the pole shells are each provided with a pole shell attachment web and, on the inside, have a number of circumferential transverse ribs which run approximately at right angles to the longitudinal axes of the pole shells, and the number of which is matched to the voltage conditions in the vacuum contactors.

Figure 1:
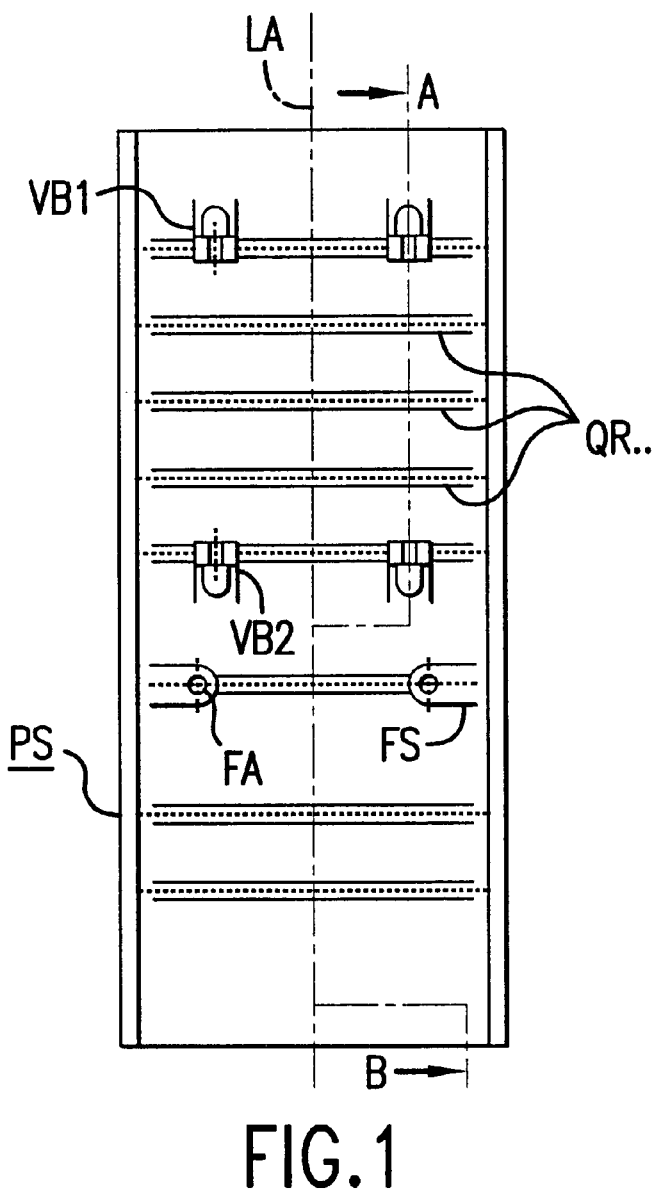

Pole shells are used for mounting vacuum contactors in switchgear assemblies for electrical power supply and distribution.

3 Claims, 1 Drawing Sheet

INSULATING CARRIERS FOR VACUUM CIRCUIT BREAKERS

This application claims priority to International Application No. PCT/DE99/03307 which was published in the German language on Oct. 12, 1999.

TECHNICAL FIELD OF THE INVENTION

The invention relates to insulating bases for vacuum switches, and in particular, to insulating bases for vacuum switches having drive devices for installation in switchgear assemblies.

BACKGROUND OF THE INVENTION

Conventional insulating bases for vacuum switches are known from DE-U 94 09 006.

In this case, the vacuum switches are in the form of vacuum switching tubes which are installed in gas-filled containers in switchgear assemblies, and are surrounded by two insulating bases. In practice, each vacuum switching tube has its own insulating housing formed from two insulating bases. To switch the phases, the vacuum switching tubes are controlled by a common drive device.

Vacuum contactors, in which the switching frequency is several times that of vacuum switching tubes (although the switching voltage load is lower) are, on the other hand, accommodated in blocks, in a known manner, in a common insulating housing. In this case as well, a number of vacuum contactors are controlled simultaneously by the common drive device in polyphase switchgear assemblies.

SUMMARY OF THE INVENTION

In one embodiment of the invention, an insulating base for vacuum switches. A drive device for installation in switchgear assemblies, the insulating bases being formed from a plastic profile in the form of a flat bed, having an end regions equipped with a first attachment limb with screw mountings, arranged symmetrically with respect to a longitudinal center, for detachable connection to the vacuum switches, and a second end region equipped with a second attachment limb having screw mountings, and arranged symmetrically with respect to the longitudinal center, for detachable connection to the switchgear assemblies. The insulating bases is in the form of a pole shell for accommodation of vacuum contactors, the pole shell having an enclosure profile curved inward, for detachable connection to the vacuum contactors, the pole shell is equipped with vacuum contactor attachment webs which are arranged as mirror images of one another, for detachable connection to the switchgear assemblies, the pole shell is equipped with a pole shell attachment web, and on the inside, the pole shell has a number of circumferential means of which the wide range of attachment elements is considerably reduced in comparison to the previously normal standard, without restricting the normal, stringent safety requirements for this technology.

The invention defines a mounting concept for vacuum contactors, by means of which the wide range of attachment elements is considerably reduced in comparison to the previously normal standard, without restricting the normal, stringent safety requirements for this technology.

According to the invention, this is achieved by the following features:

- the insulating bases are in the form of pole shells for accommodation of vacuum contactors,
- the pole shells each have an enclosure profile curved inward,
- for detachable connection to the vacuum contactors, the pole shells are each equipped with vacuum contactor attachment webs which are arranged as mirror images of one another,
- for detachable connection to the switchgear assemblies, the pole shells are each equipped with a pole shell attachment web, and
- on the inside, the pole shells have a number of circumferential transverse ribs which run approximately at right angles to the longitudinal axes of the pole shells, and the number of which is matched to the voltage conditions in the vacuum contactors.

The invention is thus based on the knowledge of combining the advantages of a standard insulating housing with high robustness for vacuum contactors and the greater flexibility for installation of vacuum tubes of different types and with separately associated insulating housings with one another. The enclosure profile, which is curved inward, with its number of circumferential transverse ribs matched to the respective voltage conditions means that the insulating housing is also provided with sufficient dimensional stability for vacuum contactors. This dimensional stability is further reinforced in a particular manner by the vacuum contactor attachment web and the vacuum contactor attachment webs, which are arranged as mirror images of one another.

According to one advantageous refinement of the invention, the following features are provided:

- the pole shells are each provided with a guide web in the region in which the force of the drive device acts, and
- the free ends of the guide web, which point inward, each have a guide recess.

The guide web means that suitable centering and guide means effectively protect the moving parts of the vacuum contactors against any forces which act transversely, thus increasing the number of switching interruptions, and hence considerably lengthening the life of the vacuum contactors.

A further refinement of the invention provides the following feature:

- the enclosure profile, which is curved inward, of the pole shells is dimensioned in such a manner that vacuum contactors with a different circumference and a different distance between them are installed in the switchgear assemblies using pole shells of an identical type.

Pole shells designed in this way allow vacuum contactors of different type to be installed in switchgear assemblies without any design changes to them.

The invention combines the advantages of a standard insulating housing with high robustness for vacuum contactors and the greater flexibility for installation of vacuum tubes of different types and with separately associated insulating housings with one another. The enclosure profile, which is curved inward, with its number of circumferential transverse ribs matched to the respective voltage conditions means that the insulating housing is also provided with sufficient dimensional stability for vacuum contactors. This dimensional stability is further reinforced in a particular manner by the vacuum contactor attachment web and the vacuum contactor attachment webs, which are arranged as mirror images of one another.

FIG. 1 shows the pole shell PS with the longitudinal axis LA. The upper and lower vacuum contactor attachment webs VG1 and VG2, respectively, which are arranged as mirror images of one another, can be seen in the visible internal area of the pole shell PS. The vacuum contactors, which are not shown, can be arranged between the vacuum contactor attachment webs VG1 and VG2 by using attachment means, which are likewise not shown. Furthermore, the continuous guide web FS is located underneath the lower vacuum contactor attachment web VG2 and is provided with a guide recess FA on each of the free ends which point inward. When corresponding centering and guide means engage in the guide recesses FA in the guide web FS, the transverse forces which occur during switching of the vacuum contactors can very largely be prevented from being transported to the moving parts, so that the life of the vacuum contactors can be lengthened by a greater number of switching interruptions.

Figure 2:
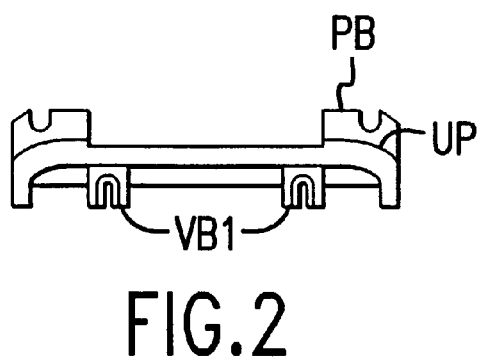

FIG. 2, which illustrates the plan view of the pole shell PS (FIG. 1), shows, in particular, the enclosure profile UP which is curved inward. The pole shell attachment web PB can also be seen, with a screw attachment which is not illustrated.

Figure 3:
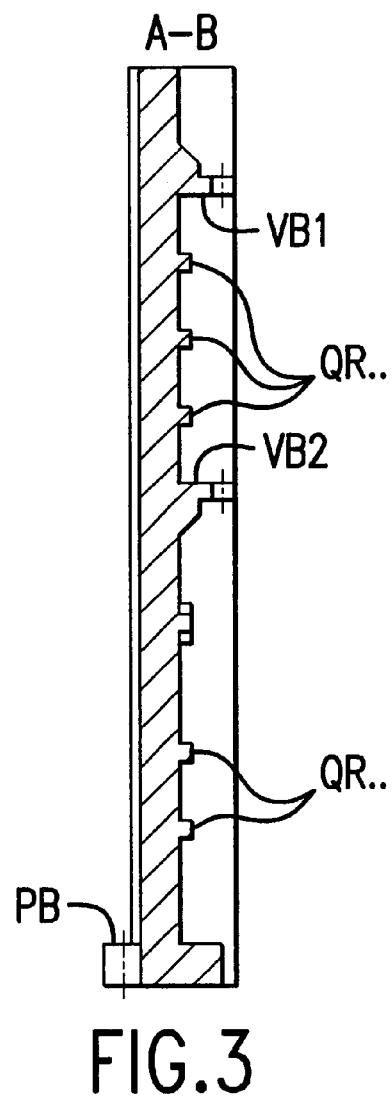

FIG. 3 shows the pole shell PS (FIG. 1) in a profile section along the section line A–B (FIG. 1). This illustration clearly shows the profile reinforcements resulting from the vacuum contactor attachment webs VB1 and VB2 and the transverse ribs QR··· arranged parallel to them. The vacuum contactor attachment webs VB1 and VB2, which are reinforced at the top and bottom, mean that vacuum contactors can be mounted securely between the pole shells PS (FIG. 1).

What is claimed is:

1. An insulating base for vacuum switches, comprising:
  a drive device for installation in switchgear assemblies, the insulating base being formed from a plastic profile in the form of a flat bed, having an end region equipped with a first attachment limb with screw mountings, arranged symmetrically with respect to a longitudinal center, for detachable connection to the vacuum switches, and a second end region equipped with a second attachment limb having screw mountings, and arranged symmetrically with respect to the longitudinal center, for detachable connection to the switchgear assemblies, wherein
  the insulating base is in the form of a pole shell for accommodation of vacuum contactors,
  the pole shell having an enclosure profile curved inward,
  for detachable connection to the vacuum contactors, the pole shell is equipped with vacuum contactor attachment webs which are arranged as mirror images of one another,
  for detachable connection to the switchgear assemblies, the pole shell is equipped with a pole shell attachment web, and
  on the inside, the pole shell has a number of circumferential transverse ribs which run approximately at right angles to a longitudinal axes of the pole shell, and a number of which is matched to the voltage conditions in the vacuum contactors.

2. The insulating base as claimed in claim 1, wherein
the pole shell is provided with a guide web in a region in which a force of the drive device acts,
and free ends of the guide web, which point inward, each have a guide recess.

3. The insulating bases as claimed in claim 1, wherein
the enclosure profile, which is curved inward, of the pole shell is dimensioned in such a manner that vacuum contactors with a different circumference and a different distance between them are installed in the switchgear assemblies using a pole shell of an identical type.

* * * * *